United States Patent [19]

Terry

[11] 4,372,176
[45] Feb. 8, 1983

[54] TAPERED TOOTH HELICAL GEAR DRIVE TRAIN FOR ELIMINATING THE NEED FOR END THRUST BEARINGS

[76] Inventor: Clegia L. Terry, 2116 Curving Rd., Knoxville, Tenn. 37912

[21] Appl. No.: 189,183

[22] Filed: Sep. 22, 1980

[51] Int. Cl.³ .............................................. F16H 55/18
[52] U.S. Cl. ........................................ 74/409; 74/392
[58] Field of Search ............... 74/409, 392, 440, 458, 74/466, 410

[56] References Cited

U.S. PATENT DOCUMENTS

| | | | |
|---|---|---|---|
| 415,044 | 11/1889 | Joslin | 74/440 |
| 1,683,758 | 9/1928 | Candee | 74/458 |
| 1,989,663 | 2/1935 | Bethune | 74/466 |
| 3,079,808 | 3/1963 | Wildhaber | 74/458 |
| 3,405,580 | 10/1968 | Hallden | 74/409 |
| 3,563,108 | 2/1971 | Wydler | 74/458 |
| 3,765,303 | 10/1973 | Fischer | 74/458 X |
| 3,812,737 | 5/1974 | Campbell | 74/458 X |
| 4,187,735 | 2/1980 | Terry | 74/410 |

Primary Examiner—Nile C. Byers, Jr.
Attorney, Agent, or Firm—Pitts & Kesterson

[57] ABSTRACT

A method and apparatus for eliminating axial thrust and consequently the need for thrust bearings in parallel shaft and crossed-axis helical drive arrangements is disclosed. According to this invention, a gear with helically cut teeth which maintain a constant profile but have a uniformally tapered top land and bottom land, the top land of which increases in width as the bottom land decreases in width is mounted on a shaft. This tapered tooth helical gear is meshed with a second similar gear mounted in meshing proximity on a second shaft. During operation the axial forces associated with helical gears are resisted by the compressive interfacing, with zero backlash, of the tapered teeth. Thus, the need for thrust bearings is eliminated.

10 Claims, 4 Drawing Figures

TAPERED TOOTH HELICAL GEAR DRIVE TRAIN FOR ELIMINATING THE NEED FOR END THRUST BEARINGS

BACKGROUND OF THE INVENTION

This invention relates to helical gears and more particularly to helical gears with tapered teeth for the purpose of eliminating axial force and consequently eliminating the need for thrust bearings.

As is well known and recognized by those skilled in the art, a pair of helical gears can be used to transfer power or force from one shaft to another while providing considerable advantage over similar spur straight toothed gears. For example, helical gears may be used to transfer power from one shaft to another regardless of the angular relationship of such shafts. Additionally, in regular spur gears the teeth come into contact along the entire face width and the contact is along a line parallel to the axis at all times. Helical gears start contact at a point which is one extreme of interfacing of the teeth and the contact progresses across the tooth width to the other extreme interfacing of the teeth. As a result, helical gears can be operated at higher speeds or greater loads than equivalent spur gears, are quieter in operation and have less vibration. Because of these advantages, helical gears are preferred for use in heavy power transmission application, heavy duty gear boxes and the like. Unfortunately, the use of helical gears has disadvantages as well as advantages. Since the force transmitted between the teeth of two meshing helical gears is always normal to the tooth surfaces, helical gears generate a component force along the axis of the gear which causes end thrust. In presently available gearing applications, such end thrust is typically countered by the use of herringbone gears and helical gears in combination with straight toothed spur gears. Herringbone gears, as will be appreciated by those skilled in the art, comprise two helical gears of opposite hand (i.e. the direction of the helix is different for those two gears) mounted on respective shafts. Thus, the axial or end thrust created by one-half of the herringbone gear is countered by the end thrust or axial force created by the helical gear having the opposite hand. Examples of herringbone gears are illustrated in U.S. Pat. No. 415,044 issued to W. Joslin on Nov. 12, 1889 and U.S. Pat. No. 1,989,633 issued to J. Bethune on Feb. 15, 1935. A helical-gear spur-gear combination, as will be appreciated by those skilled in the art comprise a helical-gear, spur-gear combination with the same pitch diameter and center of rotation are securely attached to each other and mounted to a shaft. This helical-gear spur-gear combination is meshed with a second similar helical-gear spur-gear combination supported on a parallel shaft. During operation the axial forces normally created by a helical gear drive are contained as the teeth of the two spur gears contact each other. Helical-gear spur-gear combinations are illustrated in U.S. Pat. No. 4,187,735 issued to C. L. Terry, the inventor of the present invention, on Feb. 12, 1980.

Unfortunately, end thrust bearings may not be suitable and cannot be used in all applications. Also, end thrust bearings place an additional expense upon the design of a gear transmission train. Similarly, herringbone gears, in general, are also very expensive and require accurate alignment along the shafts they connect. Likewise helical-gear, spur-gear combinations also are expensive since they require the purchase of two gears and the attachment thereof. Additionally herringbone gears and helical-gear, spur-gear combinations can only be used to drive parallel shafts. Furthermore, herringbone gears are very difficult and sometimes substantially impossible to arrange and mesh in close quarters.

To overcome the shortcomings of these and other available methods of controlling end thrust in a power transmission train, it is an object of the present invention to provide a method and apparatus which eliminates end thrust in a helical gear transmission train with parallel support shafts.

It is another object of this invention to provide a method and apparatus which eliminates end thrust in a helical gear transmission train with non-parallel, non-intersecting support shafts.

It is another object of this invention to provide a method and apparatus for eliminating the need for thrust bearings in a helical gear transmission.

It is a further object of this invention to provide a method and apparatus for eliminating end thrust in a helical gear transmission train which is self adjusting to compensate for wear.

It is yet a further object of this invention to provide a helical gear with longitudinally tapered teeth suitable for use in eliminating end thrust.

To accomplish the above mentioned objects as well as other objects which will become evident from the following drawings and detailed description, the present invention comprises a first gear with helically cut teeth having a first pitch diameter provided wherein the teeth of said gear define a constant tooth profile end to end but have a uniformally tapered top land and bottom land, such tapered lands occurring the length of the tooth with the bottom land increasing in width as the top land decreases in width. The first helical toothed gear is securely mounted to a first driving shaft so that rotative motion between the first helically cut gear and the first driving shaft is prevented. A second gear with helically cut teeth having a second pitch diameter is provided wherein the teeth of said gear spiral in the opposite direction as those of the first gear but have the same circular pitch and the same constant tooth profile as the first gear. The second gear has similarly but oppositely tapered top lands and bottom land and is suitable for meshing with said first helically toothed gear. The second helically toothed gear is securely mounted to a second driven support shaft in such a manner as to prevent rotative movement between the second helical-gear and the second driven support shaft. The first driving support shaft is positioned with respect to the second driven support shaft so that the first and second helically toothed gears are in meshing relationship to each other and the teeth of which are interfaced without backlash. The driving shaft is then rotatively driven in the direction which causes axial thrust in the direction of the interfacing of the tapered teeth which thrust is resisted by such interfacing. In one embodiment one or both of the helical gears are free to move axially on the support shafts which permits automatic compensation for wear. Thus it is seen that according to the technique of this invention, end thrust is eliminated and consequently the need for thrust bearings is eliminated.

Accordingly, the above mentioned objects and subsequent description will be more readily understood by reference to the following drawings.

Figure 1:
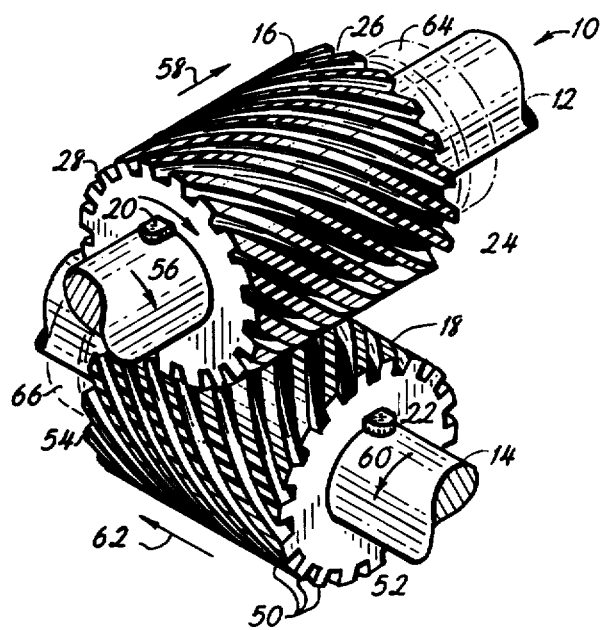
FIG. 1 is an isometric representation of a pair of tapered tooth helical gears used with crossed axis type shafts and illustrating certain features of the invention.

Referring now to the figures, a cross axis arrangement of a helically cut gear drive combination suitable for containing end thrust is generally indicated at 10 in FIG. 1. More specifically two non-parallel non-intersecting support shafts 12 and 14 are provided. The shafts 12 and 14 are fixedly located with respect to each other by some convenient means such as bearings. The shafts 12 and 14 are rotatable with one shaft 12 being the driver and one shaft 14 being driven. Further the shafts 12 and 14 are suitable size to safely withstand the applied loads. Additionally, the shafts 12 and 14 are proportioned for receiving gears 16 and 18. The gears 16 and 18 are non-rotatably affixed to the shafts 12 and 14 by means of standard keys 20 and 22, respectively. The provided keys 20 and 22 assure that rotation of the shaft results in rotation of the gear and rotation of the gear results in rotation of the shaft. Non-rotatable attachment of the gears 16 and 18 to the shafts 12 and 14 by means of keys 20 and 22 further permit axial movement of the gears 16 and 18 with respect to their respective shaft 12 and 14. The shafts 12 and 14 are further positioned with respect to each other to maintain the gears 16 and 18 in meshing proximity. This allowance for axial movement of gears 16 and 18 provides the means for continuous self adjustment of the gears to compensate for normal wear by axial advancement.

Figure 2:
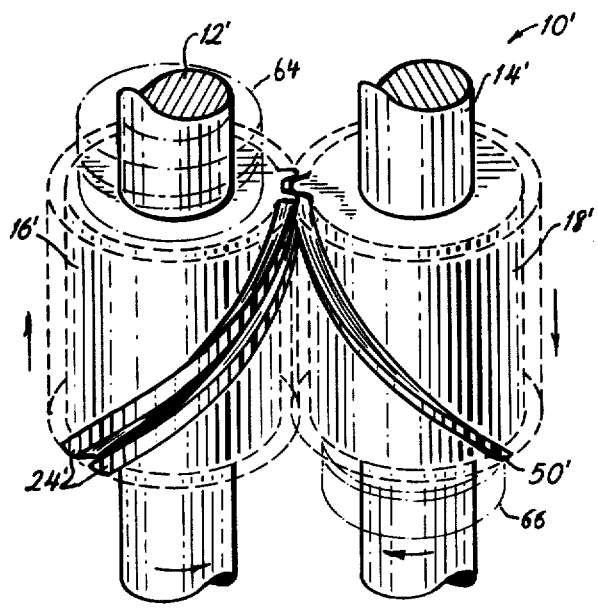
FIG. 2 is an isometric representation partially schematic of a pair of tapered tooth helical gears used with parallel shafts.

In an alternate embodiment of the crossed axis arrangement a parallel axis shaft arrangement is generally indicated at 10' in FIG. 2. In this arrangement, similarly supported, spaced and keyed shafts 12' and 14' are provided with shafts are parallel.

Figure 3:
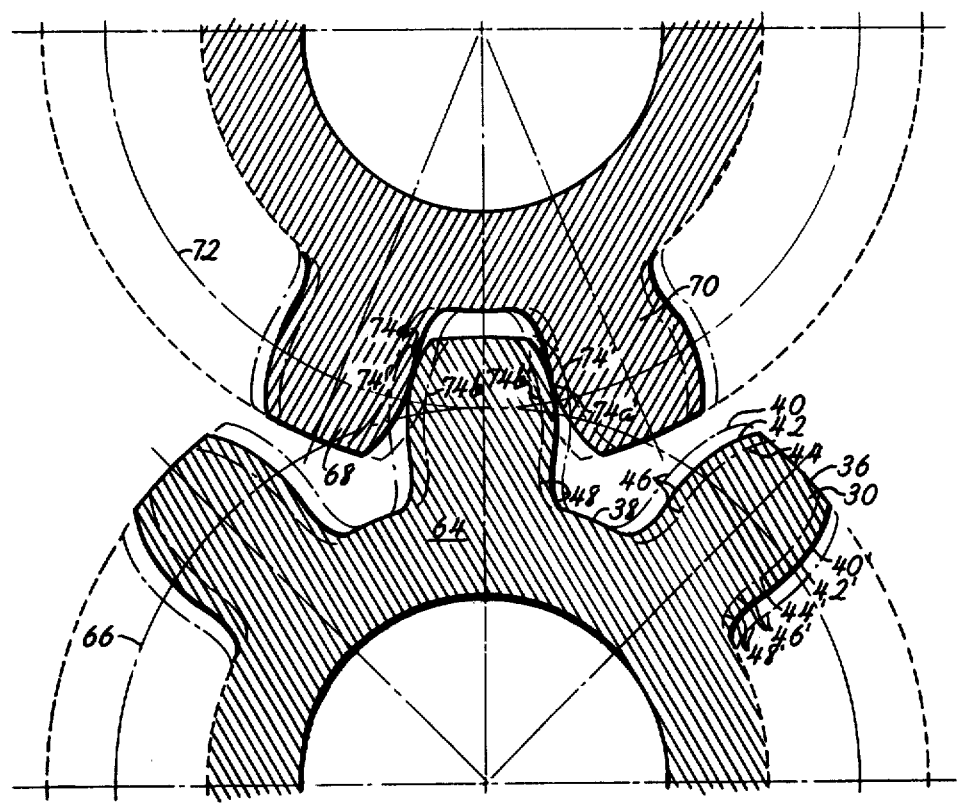
FIG. 3 is a representation of the meshing teeth of two gears illustrating the differences in the top and bottom lands.
Figure 4:
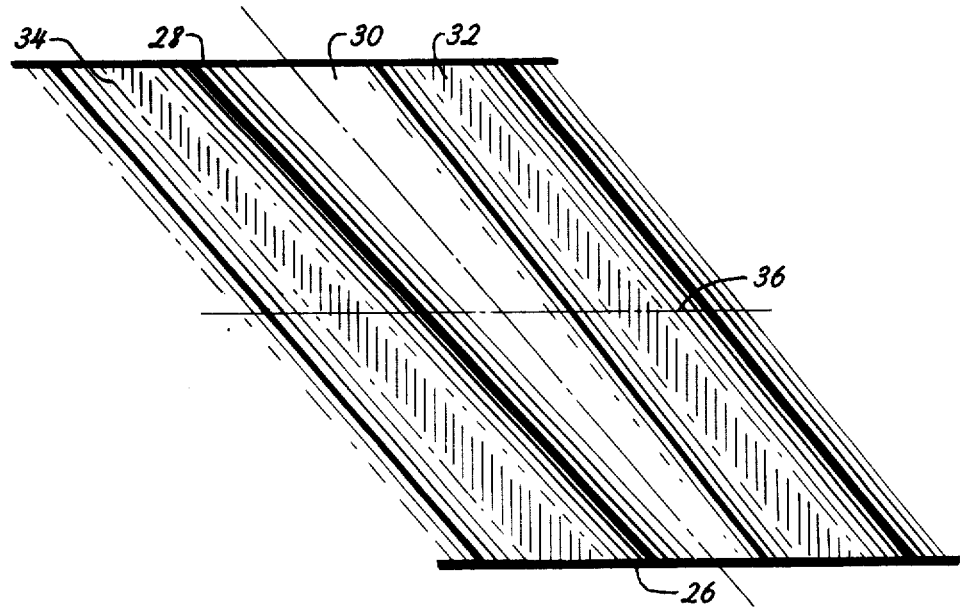
FIG. 4 is a development showing details of a tapered tooth constructed in accordance with various features of the invention.

A first gear 16 in FIG. 1 is mounted to driving shaft 12. The gear 16 contains a multiplicity of helically cut teeth 24 which extend completely from one side 26 of the gear 16 to the other side of the gear 28. The teeth 24 are sloped at a convenient angle and direction to provide a smooth transmission of power in the required direction and at the transverse pressure angle. The teeth 24 are tapered as is illustrated in FIG. 3 and 4 wherein a specific tooth 30 which is representative of all the teeth, is described. The tooth 30, shown developed in FIG. 4 is decreasingly tapered from side 28 to side 26 of the gear. Similarly the spaces 32 and 34 between the teeth are increasingly tapered from side 28 to side 26 of the gear with the width of the tooth 30 being equal to the width of the spaces 32 and 34 at the median 37 between the sides 26 and 28. Further the width of the tooth at its widest at gear side 28 is equal to the width of the space 32 and 34 at it's widest at gear side 26. Further with the width of the tooth at its narrowest at gear side 26 is equal to the width of the space 32 and 34 at it's narrowest at gear side 28. This is accomplished as shown in FIG. 3 wherein the width of the top land 36 and the bottom land 38 are varied. More specifically, tooth 30 at gear side 28 extends to the maximum limits 40 and 40'. At the gear median which is the location of the cross-section plane for FIG. 3 the tooth 30 extends from to the median limits 42 and 42'. Further, at gear side 26 the tooth 30 extends to the minimum limits 44 and 44'. To produce this variation, the tooth profile 46 and 46', remains constant but the top land 36 and the bottom land 38 are similarly but oppositely tapered. Therefore, the teeth contain a constant tooth profile end to end but have a uniformly tapered top land and bottom land, said tapered lands occurring the length of the tooth with the bottom land increasing as the top land is decreased. It should be further noted that the circular pitch which is the distance from a point 48 on one gear tooth to a similar point 48' on an adjacent tooth remains constant for all limits 40', 42', and 44'.

A second gear 18 with helically cut teeth suitable for being meshingly driven by driving gear 16 is provided in FIG. 1. The gear 18 contains a multiplicity of helical teeth 50 which extend from side 52 to side 54. Generally, the direction of the helix in cross-axis helical gear is the same hand for the driven gear 18 as it is for the driving gear 16 although for some extreme cases it is possible to have opposite hands, particularly if the shaft angle is small. Helical gears 16' and 18' (FIG. 2) on parallel shafts 12' and 14' always have their teeth 24' and 50' spiral opposite hand. The teeth 50 (FIG. 1) of second driven gear 18 have the same circular pitch as those of the driving gear 16 and the slope of the teeth 50 is suitable for being driven by first gear 16. This provides the gears 16 and 18 with the ability to properly mesh when correctly positioned. The teeth 50 of gear 18 are tapered in the same way and manner as those of gear 16 although not necessarily in the same direction.

Rotative propulsion of a helical gear drive train produces axial thrust which must be resisted in some manner. Normally a driving shaft such as shaft 12 in FIG. 1, rotated in direction 56, causes an axial thrust in gear 16 in direction 58. Additionally, driving gear 16 mounted on shaft 12 propelling driven gear 18 in direction 60 causes an axial thrust in gear 18 in direction 62. These axial thrusts 58 and 62 are usually resisted by thrust bearings 64 and 66, but these thrust bearings are expensive, require space which may not be available, and also require constant maintenance attention (the thrust bearings are shown in phantom since their need is eliminated by the present invention).

A means for controlling end thrust in helical gears is provided which does not require thrust bearings. As has been previously described the helical teeth and the spaces between them are tapered. It should be noted that the direction of such taper is related to the direction of axial thrust 58 and 62 and provides a means for resisting such thrust. In the preferred embodiment of this invention teeth are always tapered diminishingly in the direction of thrust. Further teeth are always positioned with zero backlash which is the amount by which the width of a tooth space exceeds the thickness of the engaging tooth, measured on the pitch circle. More specifically, tooth 64 in FIG. 3 of gear 66 is interfaced with teeth 68 and 70 of gear 72. At the maximum width of tooth 64 interfacing occurs at 74 and 74'. At the median width of tooth 64 interfacing occurs at 74a and 74a'. At the minimum width of tooth 64 interfacing occurs at 74b and 74b'. This interfacing of a tapered tooth within the similarly tapered tooth space defined by the adjacent tooth profiles of teeth 68 and 70 resistively overcomes the axial thrust of the driven helical gear 66 when such thrust is in the direction of interfacing which is the direction of this tooth tapered dimenishment. This therefore provides means for controlling end thrust in helical gears which does not require the use of thrust bearings.

Means are provided for self adjustment of the tapered tooth helical gears to accomodate for normal wear. More specifically, the driving gear 16 mounted on driving shaft 12 and the driven gear 18 mounted on driven shaft 14 which gears and shafts are rotated in directions 56 and 60 generate axial thrusts 58 and 62 which is resistively overcome by the compressive interfacing of teeth 24 and 50 without backlash. The gears 16 and 18 which are non-rotatably affixed to their respectively shafts 12 and 14 by means of keys 20 and 22 which keys do not limit axial movement, move axially due to end thrust to the point of interfacing. This thereby provides a self adjusting means of compensating for normal tooth wear.

Thus, although the present invention has been described with respect to specific tapered tooth helical gear arrangements, it is not intended that such specific references and illustrations be considered limiting upon the scope of the invention except insofar as is set forth in the following claims.

What is claimed is:

1. A gear drive combination of two gears, with helically cut teeth for use with crossed axis and parallel axis shaft arrangements, wherein axial thrust is contained by the thrust-resistive interfacing of said gears, comprising:
   a first support shaft rotatably driven in a direction;
   a first gear with helically cut teeth non-rotatably mounted on said first support shaft, said teeth having a constant tooth profile end-to-end and a uniformly-tapered top land and bottom land, said tapered lands occurring the length of each tooth with the width of said bottom land increasing as the width of said top land is decreasing;
   a second gear with helically cut teeth which spiral in a pre-selected direction with respect to said teeth of said first gear, said teeth of said second gear having the same circular pitch and the same constant tooth profile as said teeth of said first gear with a similar but oppositely directed uniformly tapered top land and bottom land, said teeth of said second gear drivingly interfaced with said teeth of said first gear without backlash;
   a second support shaft upon which is non-rotatably mounted said second gear so that rotation of said second gear results in rotation of said second support shaft, and whereby said second gear is held in driving proximity to said first gear with a pitch diameter of one gear concurrent with the pitch diameter of the other gear at a single point, and with the longitudinal axis of said second support shaft non-parallel and not intersecting with the longitudinal axis of said first support shaft;
   and wherein said top lands of teeth of said first and said second gears decrease in a direction of axial thrust produced by the driving of said second gear by said first gear.

2. A gear drive combination of two gears with helically cut teeth for use with parallel drive shafts wherein axial thrust is contained by the thrust-resistive interfacing of said gears, comprising:
   a first support shaft rotatably driven in a direction;
   a first gear with helically cut teeth non-rotatably mounted on said first support shaft, said teeth having a constant tooth profile end to end and a uniformly tapered top land and bottom land, said tapered land occuring the length of each tooth, with the bottom land increasing in width as the top land is decreasing in width;
   a second gear with helically cut teeth which spiral in the opposite direction from said first gear, the teeth of said second gear having the same constant tooth profile as said teeth of said first gear with similar but oppositely directed uniformly tapered top lands and bottom land, and which second gear teeth drivingly interface with said teeth of said first gear without backlash;
   a second support shaft on which is non-rotatably mounted said second gear so that rotation of said second gear results in the rotation of said second shaft, and whereby said second gear is held in driving proximity to said first gear with a pitch diameter of one gear concurrent with the pitch diameter of the other gear along a single straight line, and with the longitudinal axis of said second shaft parallel to the longitudinal axis of said first shaft; and
   wherein said top lands of said teeth of said first and second gears decrease in the direction of axial thrust produced by the driving of said second gear by said first gear.

3. The drive combination of claims 1 or 2 wherein said first and said second gears have a constant tooth profile and which are uniformly tapered end-to-end by means of tapered top and bottom lands wherein said tapered top land decreases in width as said tapered bottom land increases in width, and wherein said land taper of said first gear is in a direction opposite said land taper of said second gear.

4. The drive combination of claims 1 or 2 wherein at least one of said gears is free to move in an axial direction along the shaft to which it is nonrotatably mounted.

5. A method of transmitting power from a driving shaft to a driven shaft, comprising the steps of:
   providing a first gear with helically cut teeth having a first pitch diameter, said teeth of said first gear having a constant tooth profile end-to-end, and a uniformly tapered top land and bottom land, such tapered lands occuring the length of each tooth with the bottom land increasing in width as the top land is decreasing in width;
   providing a first and a second support shaft;
   mounting said first gear upon said first support shaft such that rotation of said first support shaft causes rotation of said first gear;
   providing a second gear with helically cut teeth having a second pitch diameter, said teeth of said second gear spiraling in a direction which provides meshing with said teeth of said first gear, and having the same circular pitch and the same constant tooth profile as said teeth of said first gear, with similarly and oppositely directed tapered top lands and bottom lands for meshing with said first gear;
   mounting said second gear upon said second support shaft such that rotation of said second gear causes rotation of said second support shaft; and
   positioning said second support shaft relative to said first support shaft at a distance such that said first gear is in meshing relationship with said second gear and the teeth of said gears are interfaced without backlash.

6. The method of claim 5, wherein the positioning of said second support shaft is non-parallel to and non-intersecting with said first support shaft at a distance such that said first gear is in meshing relationship with said second gear, and the teeth of said gears are interfaced without backlash.

7. The method of claim 5 or 6, wherein the absence of backlash provides axial retainment of said tapered teeth of one gear by said tapered teeth of the second gear, which retention is sufficient to overcome axial thrust generated by the rotational drive of such intermeshed gears.

8. The method of claims 5 or 6, where the absence of backlash provides a positive orientation of said first and said second gears one to the other.

9. The method of claims 5 or 6 where in at least one of said gears is free to move in an axial direction along the shaft to which it is mounted.

10. The method of claim 9, wherein said axial movement of at least one of said first and second gears precipitated by an axial thrust generated by rotational drive acting in a direction which causes interfacing of said tapered helical teeth provides a self-adjusting method that compensates for tooth wear and overcomes axial thrust of said gears.

* * * * *